E. A. NELSON.
TRANSMISSION GEAR FOR MOTOR VEHICLES.
APPLICATION FILED JAN. 24, 1906.
899,258.
Patented Sept. 22, 1908.
3 SHEETS—SHEET 3.
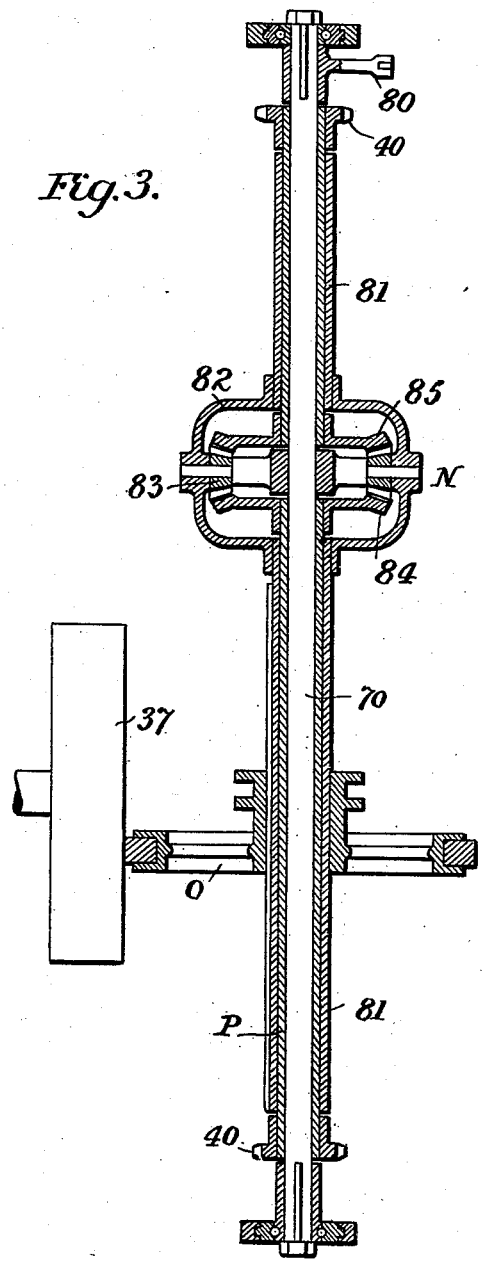
Witnesses
J. G. Stinkel
B. C. Rust
Inventor
Emil A. Nelson
by John Freeman Watson
Attorneys

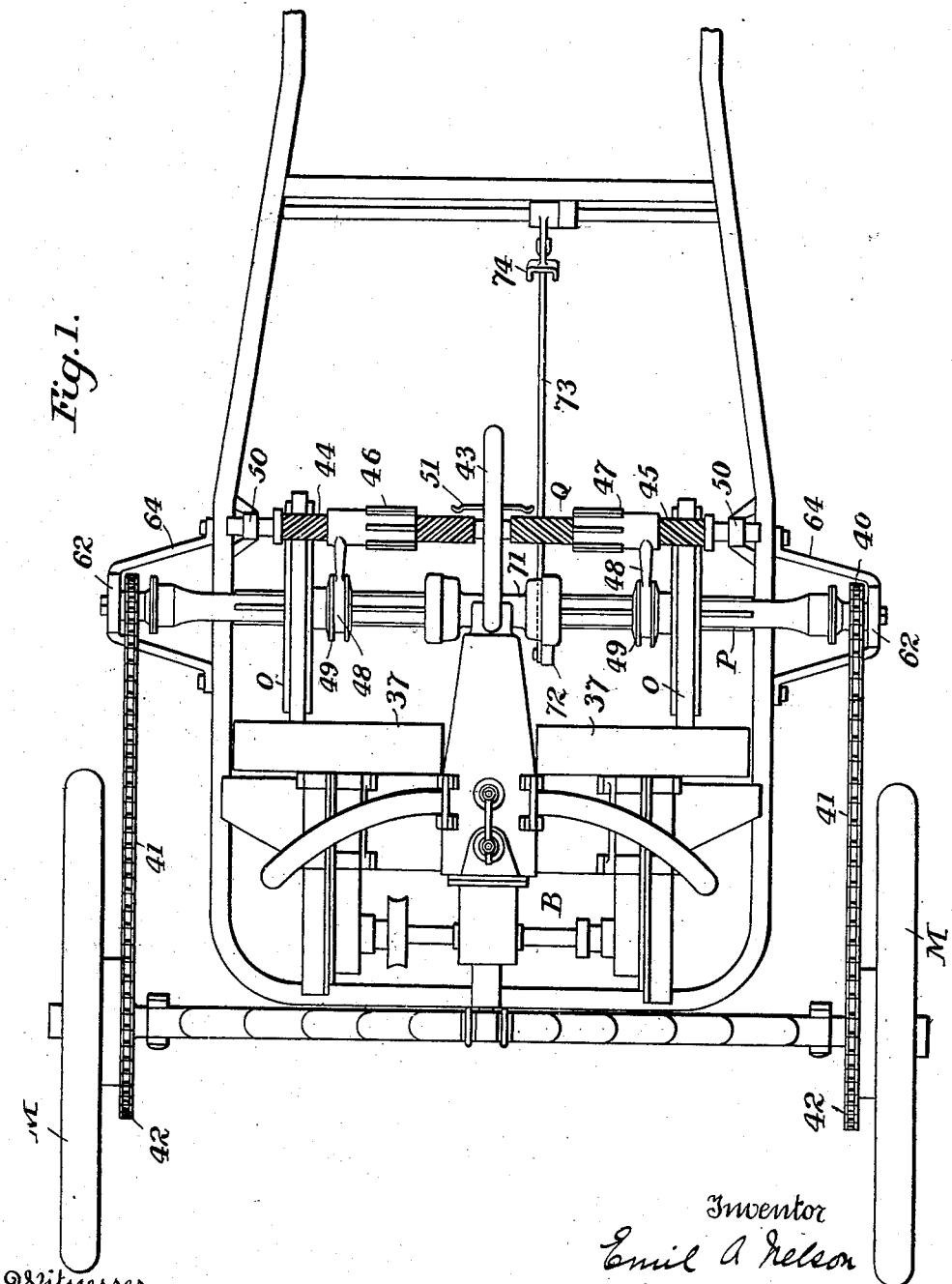

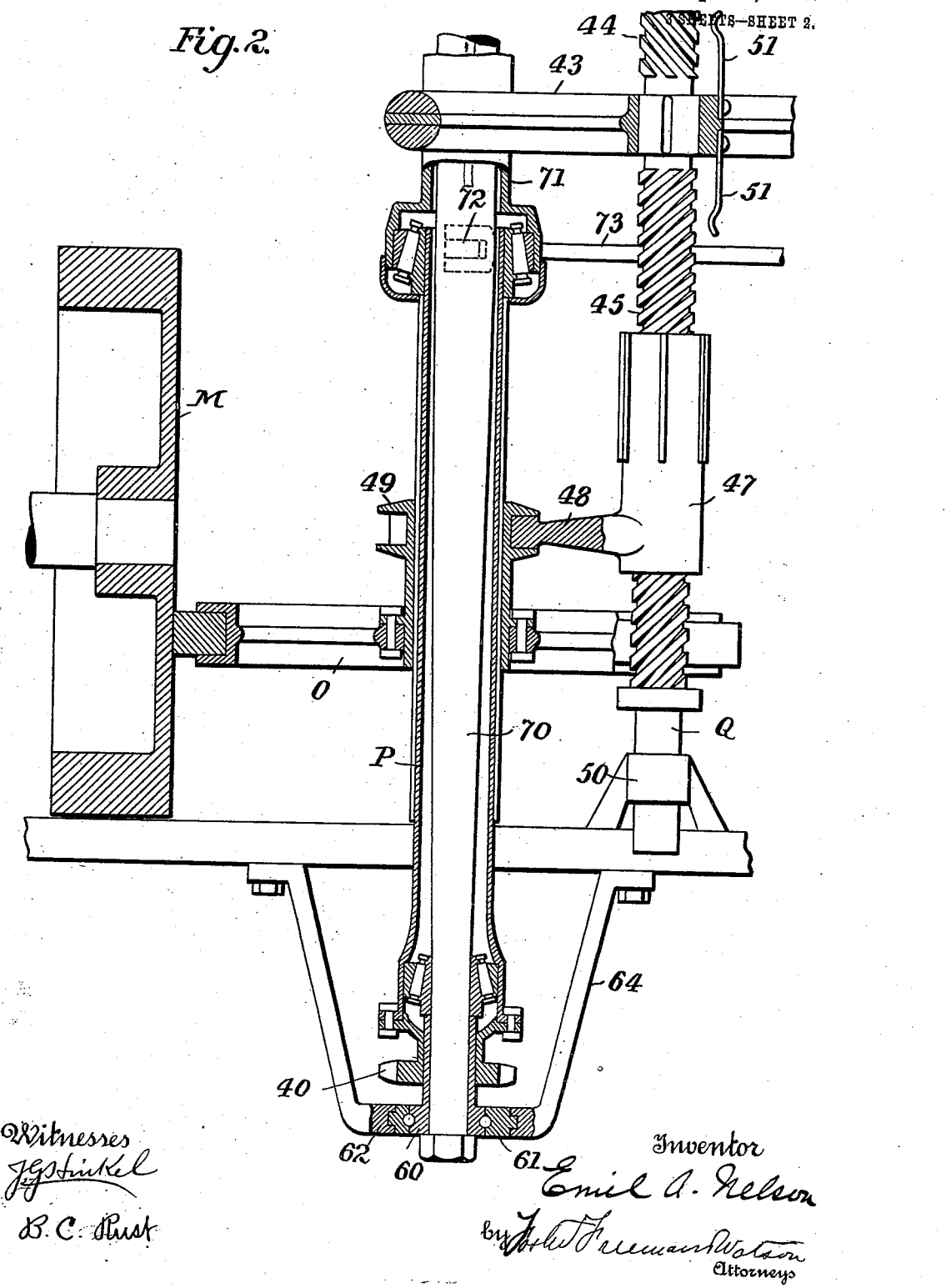

UNITED STATES PATENT OFFICE.

EMIL A. NELSON, OF DETROIT, MICHIGAN, ASSIGNOR TO WILLIAM J. NEWTON AND CHARLES J. WOODALL, OF DETROIT, MICHIGAN.

TRANSMISSION-GEAR FOR MOTOR-VEHICLES.

No. 899,258.      Specification of Letters Patent.      Patented Sept. 22, 1908.

Application filed January 24, 1906. Serial No. 297,626.

*To all whom it may concern:*

Be it known that I, EMIL A. NELSON, a citizen of the United States, residing at Detroit, in the county of Wayne and State of Michigan, have invented certain new and useful Improvements in Transmission-Gear for Motor-Vehicles, of which the following is a specification.

My invention relates to transmission gear for motor vehicles, when a friction drive is employed, and has for its object to adjust the pressure of the friction faces to the resistance of the drive wheels of the vehicle, to positively vary the ratio of friction to the resistance, and to adjust the operations of the parts to the varying conditions, to which end I construct the parts as fully set forth hereinafter and illustrated in the accompanying drawing, in which Figure 1 is a plan view of a motor vehicle with my improvements; Fig. 2, an enlarged plan in part section; Fig. 3, a sectional plan showing the arrangement when but one driving disk is used. Figs. 4 and 5 are views showing the end bearings of the friction wheel shaft in different positions. Fig. 6 illustrates a modified support for the friction wheel shaft.

An engine B of any suitable type is mounted upon a vehicle and drives one or more friction disks 37, from which movement is communicated to the drive wheels M of the vehicle.

As shown, a friction wheel O bears peripherally against the face of each disk 37 and is carried by a shaft P, the axis of which is at right angles to those of the disks, and said shaft carries at each end, a sprocket 40 with which engages a chain 41 which extends to a sprocket 42 connected with one of the drive wheels M. Where there are two friction disks and friction wheels, the latter are combined with suitable means of shifting them simultaneously inward or outward to vary the speed as required, said means being actuated from the seat of the vehicle by means of a hand device, as for instance, a hand wheel 43.

The shifting means shown consists of a shaft Q having reverse threaded portions 44, 45, to which are adapted threaded sleeves 46, 47, each with a forked arm 48 that engages an annular recess in the hub 49 of one of the wheels O. Each wheel O turns with its shaft P, but can slide thereon, as the sleeve is moved inward or outward on turning the shaft Q.

In order that the driving means may be accommodating to the varying action or speed or resistance of the drive wheels M when the vehicle is moving in a curve or turning from a straight line, the wheels O are connected so that they may be moved together laterally in the same direction to a limited extent. Different means may be employed for permitting this free, lateral simultaneous movement of the two disks, but as shown, it is secured by mounting the shaft Q, so as to slide to a limited extent in its bearings 50, 50. So long as there is the same resistance at both wheels M, M, the shaft Q should remain in its central position, but when in consequence of the turning of the vehicle, the outer wheel should turn faster than the inner one in order to reduce the slip at the outer friction wheel O, the operator can bear on the hand wheel 43 and carry the shaft Q and the other friction wheel laterally until the position of the periphery of the outer wheel O upon the disk will afford an increase of speed of this wheel over that of the inner wheel. To secure this result but a limited movement of the shaft Q is required, so that the hand wheel 43 may be keyed to the said shaft to move therewith, and the hand wheel may occupy a position between the two front seats of the vehicle, as shown, or it may be at the end of the shaft Q.

In order that the operator may know when the wheels O are brought to or approach nearly the axes of the drive disks, the hand wheel is provided with a double spring blade 51, each end of which is in position to be struck by the end of the sleeve 46 or 47 as the wheel O approaches the axis of the disk, the spring being thus compressed, and when the sleeve leaves this position, the spring is released, so that the operator can tell by feeling the contact movement of the spring while upon the part 47, and by its contact and release what is the position of the friction wheel.

In a friction drive, it becomes important to increase the pressure when the friction wheel is brought nearer the center of the driving disk, and when there is an increased resistance at the drive wheels of the vehicle, as for instance in climbing hills. In order to effect this increase of pressure automatically, I support each shaft P, or the outer end of said shaft if but one is used, so that it can move inward to a limited extent, and make use of the increased pull on either portion of the chain to carry the shaft towards the disk, whereby whenever there is an increased resistance at the driving wheel, there will be a corresponding increase of pressure between the wheel O and the disk. But a slight movement of the shaft P is required to effect this result and the shaft may be mounted in different ways to permit a movement toward the driving disk under the stress on either part of the chain.

As shown in Fig. 2, the shaft is hollow and is supported by and rotates round a bar 70 which is keyed at each end eccentrically to a disk 60, and at the center to a sleeve 71. Owing to the eccentricity of the bar and shaft to the disk 60, any draft upon either the upper part of the chain in going forward or the lower part in backing will tend to shift the bearing 60 to automatically carry the shaft P and wheel O toward the disk. To effect the same result positively by the operator, the rod 70 may be rocked by means of an arm 72, shown in dotted lines, Fig. 2, downwardly extending from the sleeve 71 and connected by a rod 73 with a foot lever 74. By this means also, the ratio of the pull of the chain to the frictional bearing of the driving faces may be varied positively at will within any required limits. Each eccentric is peripherally grooved to receive anti-friction balls adapted to an eccentric opening in an adjustable disk 61 mounted to be turned in the divided clamp head 62 of a bracket 64. By turning the disk 61, by a spanner or otherwise, the disk 60 and rod 70 and hollow shaft are set laterally as may be required to tighten or loosen the chain, to compensate for wear of the friction wheels, the clamp being then tightened to hold the disk 61 in place.

In Fig. 3, I have shown an arrangement where but one friction wheel is used. The rod and hollow shaft are mounted as before, the rod being provided with an arm 80 which may be connected with or constitute a foot or hand lever, but the friction wheel turns with and slides on an outer sleeve 81 carrying the housing 82 of a differential gear N. The housing carries the studs of pinions 83 which gear with the bevel gears 84, 85 attached to the two sections of the divided shaft P.

In Fig. 6, the bracket 90 is used instead of the bracket 64 shown in the other figures, and this bracket 90 has an elongated opening 91 through which extends the rod 70 and against which bears a washer 92 on the shaft. The pull of the chain can thus carry the rod in the slot to increase the adhesion of the friction wheel and disk, the sprocket being of such a diameter in respect to that of the disk as will secure the proper leverage and the right pressure between the friction faces.

Without limiting myself to the construction and arrangement shown, I claim:

1. The combination with the independent drive wheels of a vehicle, of a motor and friction disks connected to be driven thereby, a friction wheel peripherally engaging each disk and each geared with one of the drive wheels, and means for shifting the friction wheels simultaneously inward and outward, said means supported to slide to a limited extent to carry both friction wheels simultaneously in the same direction, substantially as set forth.

2. The combination with the independent drive wheels of a vehicle, of a motor and friction disks connected to be driven thereby, a friction wheel peripherally engaging each disk and sprocket and chain gearing connecting each disk and one of the drive wheels, and means for shifting the friction wheels simultaneously inward and outward, said means supported to slide to a limited extent to carry both friction wheels simultaneously in the same direction, substantially as set forth.

3. The combination with the drive wheels of a vehicle, of independent friction wheels each geared to one of the drive wheels, shifting devices whereby to carry the friction wheels simultaneously inward or outward, and a support for the shifting devices constructed to permit the same to move laterally with both friction wheels, substantially as set forth.

4. The combination with the driving wheels of a vehicle of a shaft consisting of two sections, a sprocket on each, a sprocket connected with each driving wheel, chains between the sprockets of the driving wheels and the shaft, a friction wheel upon each section of the shaft, and an engine a friction disk driven thereby with which the said friction wheel engages.

5. The combination with the two friction disks, of friction wheels peripherally engaging said disks, a shaft with reverse threads, threaded sleeves on said shaft, each connected with one of the wheels to move it laterally, and means for rotating said shaft to simultaneously carry the wheels inward or outward, substantially as set forth.

6. The combination with the two friction disks, of friction wheels peripherally engaging said disks, a shaft with reverse threads, threaded sleeves on said shaft, each connected with one of the wheels to move it laterally, and means for rotating said shaft to simultaneously carry the wheels inward or outward, said shaft mounted to slide longitudinally and freely with the wheels to a limited extent, substantially as and for the purpose set forth.

7. The combination with the drive wheel of a vehicle a sprocket connected therewith, of a friction disk, a friction wheel, shaft carrying said wheel and a sprocket thereon, a chain directly connecting the sprockets of the shaft and drive wheel, and a rotatable bearing for the outer end of the shaft in which the shaft is eccentrically mounted, substantially as set forth.

8. The combination with the drive wheel of a vehicle a sprocket connected therewith, of a friction disk, a friction wheel, a shaft carrying said wheel and a sprocket thereon, a chain connecting the sprockets of the shaft and drive wheel, a rotatable bearing for the outer end of the shaft in which the shaft is eccentrically mounted, and a rotatable support for said bearing in which the latter is eccentrically disposed, substantially as set forth.

9. The combination with the drive wheel of a vehicle, of a drive disk, a friction wheel engaging the drive wheel, a shaft carrying the friction wheel, gearing between the shaft and drive wheel, a bearing for the shaft movable about an axis eccentric to that of the shaft, and means whereby said bearing can be carried positively to different positions about its axis, substantially as set forth.

10. The combination with the drive wheel of a vehicle, of a drive disk, a friction wheel engaging the drive wheel, a shaft carrying the friction wheel, gearing between the shaft and drive wheel, a rocking bearing for the end of the shaft, in which the shaft is eccentrically mounted, and means for positively rocking said bearing to vary the ratio of pull to the pressure between the friction wheels, substantially as set forth.

11. The combination with the drive disk, of a rod supported in movable bearings, a hollow shaft mounted to turn about said rod, a friction wheel adjustably mounted to turn with the shaft, and means for shifting the bearings of the rod, substantially as set forth.

In testimony whereof I affix my signature in presence of two witnesses.

EMIL A. NELSON.

Witnesses:
BENGT. G. GUSTAFSON,
EDWARD C. MITCHELL.